Oct. 1, 1968 J. M. MURGIO 3,404,380

BIT-AT-A-TIME ASSEMBLY DEVICE USING MAGNETOSTRICTIVE DELAY LINES

Filed May 31, 1966 7 Sheets-Sheet 1

INVENTOR.
JOSEPH M. MURGIO
BY Charles L. Johnson Jr.
ATTORNEY

Oct. 1, 1968 J. M. MURGIO 3,404,380

BIT-AT-A-TIME ASSEMBLY DEVICE USING MAGNETOSTRICTIVE DELAY LINES

Filed May 31, 1966 7 Sheets-Sheet 2

INVENTOR.
JOSEPH M. MURGIO
BY Charles L. Johnson Jr.
ATTORNEY

STATUS WORD LOGIC

INVENTOR.
JOSEPH M. MURGIO
BY Charles L. Johnson Jr.
ATTORNEY

INVENTOR.
JOSEPH M. MURGIO
BY Charles L. Johnson Jr.
ATTORNEY

INVENTOR.
JOSEPH M. MURGIO
BY Charles J. Johnson Jr.
ATTORNEY

INVENTOR.
JOSEPH M. MURGIO
BY Charles L. Johnson Jr.
ATTORNEY

INVENTOR.
JOSEPH M. MURGIO
BY Charles L. Johnson Jr.
ATTORNEY

United States Patent Office 3,404,380
Patented Oct. 1, 1968

3,404,380

BIT-AT-A-TIME ASSEMBLY DEVICE USING MAGNETOSTRICTIVE DELAY LINES

Joseph M. Murgio, Clifton, N.J., assignor to International Telephone and Telegraph Corporation, a corporation of Delaware Filed May 31, 1966, Ser. No. 553,848
8 Claims. (Cl. 340—172.5)

This invention is directed to input/output devices for use with communication apparatus and more particularly to teletype equipment utilizing magnetostrictive delay lines for memory elements.

In communication systems the advantage of utilizing high speed, time-shared hardware to process many slow-speed communication lines has been utilized. In known systems utilizing large numbers of teletype lines however previous processors have run into the limiting factors of the extension of the scanning time consuming more and more of the available memory cycles and the problem of transfer restrictions by the scan cycle if a mass storage device is used to eliminate the need for a large core memory.

The In/Out device of this invention may be used as the concentrator which might serve to assemble large numbers of teletype inputs into computer words for entry into a message processing system. The invention is capable of handling duplex lines and the disassembly process is also accomplished. Although the assembly process does not occur directly in the core memory of the message processor, the load put on the processor for transfers in and out is relatively light. That is, only a few percent of its memory cycles are required. The concept of centralized high speed hardware for the elimination of per-line hardware is retained.

An important object of the invention is to provide an input/output device requiring a minimum of apparatus for use in the processing of the maximum number of messages or other information.

An important feature of the invention is the use of magnetostrictive delay lines to carry out the purposes of the invention.

These and other objects and features of the invention will become apparent from the following description and the drawings which are hereby made a part of the specification and in which.

The preferred embodiment of the invention is designed to service 128 duplex teletype lines although the number and type of line is not to be limited to the examples given herein.

In essence the invention is directed to an input/output device for use between teletype lines and an information processor. The apparatus of the invention sequentially samples the various teletype lines, in a time sharing manner, and reconstructs the bits, characters and words from the lines for transfer to the processor. By the use of magnetostrictive delay lines, with the associated logic, the above is accomplished with a minimum of apparatus. A status word for each teletype line is continuously circulated through a status storage means delay line while assembly words for each line are simultaneously circulated through an assembly storage means delay line. In this manner, under control of timing means, each line is sampled, in accordance with message transmission speed switch settings, and the message bits are assembled as characters. Characters are assembled as words in the main storage and then transferred out as blocks of two words, by the block storage means to the processor. A minimum of equipment is needed for a large number of communication lines in following the invention.

Figure 1:
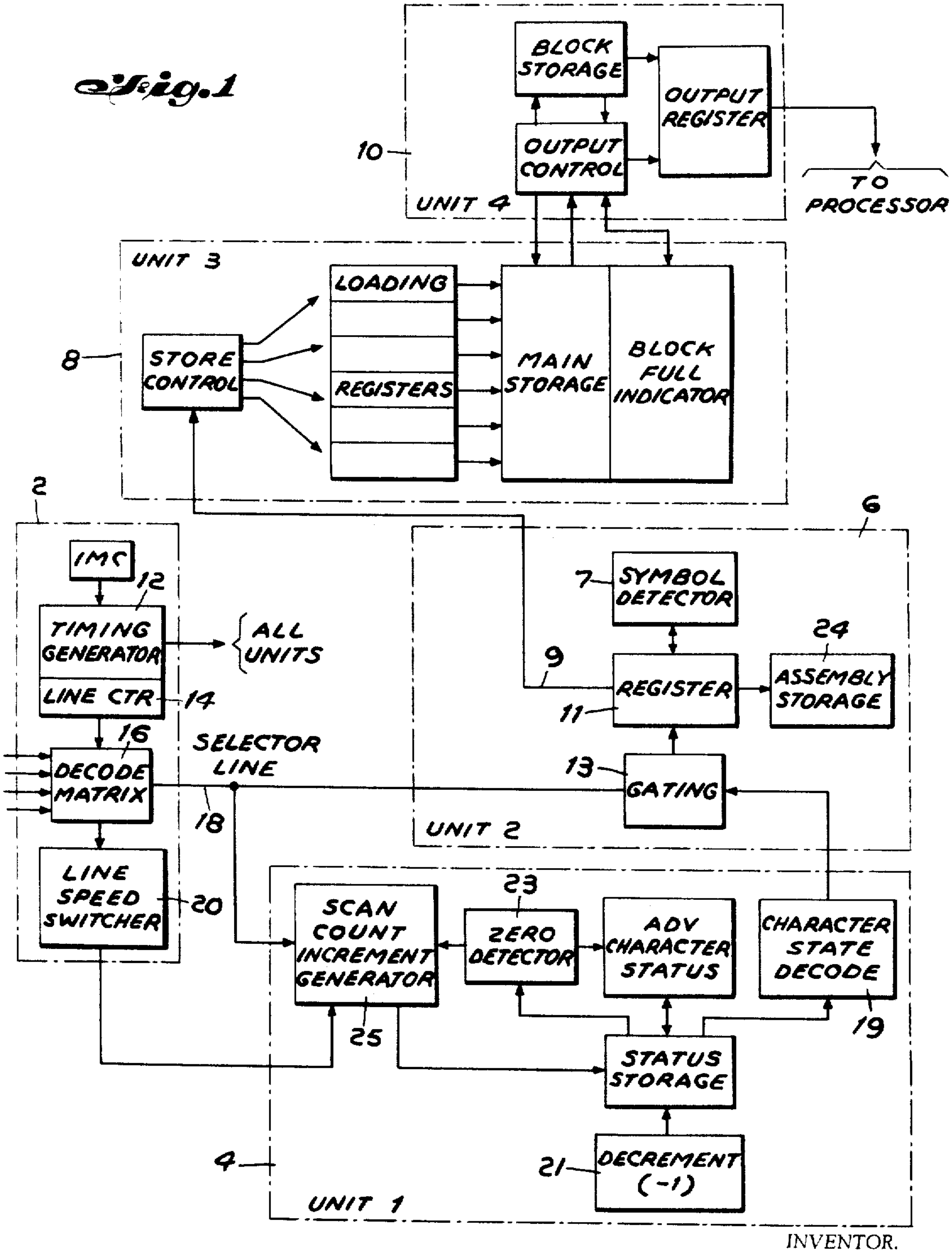
FIG. 1 is a schematic block diagram of the input section of the invention.
Figure 2:
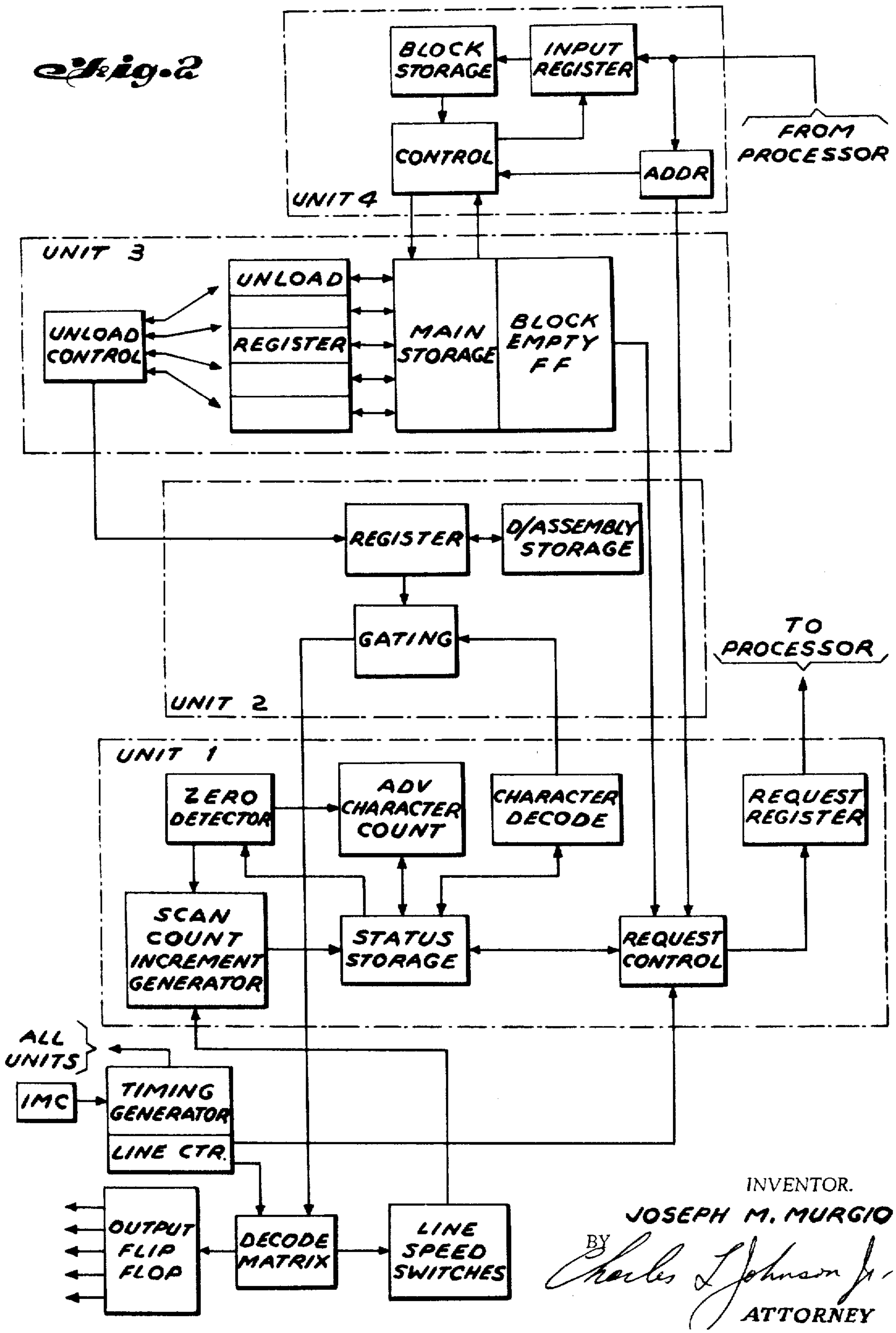
FIG. 2 is a schematic block diagram of the output section of the invention.

The input/output device may be divided into the input and the output sections as shown in the block diagrams of FIGS. 1 and 2.

As may be seen from FIG. 1 five major areas constitute the input operational arrangement for the invention. The timing and decoding means 2 is common to both the input and output sections. The status word means 4, the assembly means 6, the main storage means 8, and the block storage or processor interface means 10 completes the input section.

FIGURES 3 to 6 illustrate embodiments of the details of each of the above areas 4, 6, 8 and 10. The simplicity of this arrangement of using serial hardware should be noted.

The heart of the input/output device is the magnetostrictive delay line which is a sonic storage area capable of storing thousands of bits in a serial fashion analogous to a long shift register. The lines in the preferred embodiment will operate at a one megacycle pulse rate and will be about one millisecond long (1,000 bits). The advantages of an inexpensive lightweight input/output device using serial logic are gained while the disadvantages of magnetostrictive delay lines of being slow for accessing and volatility upon loss of power are not significant in this proposed design.

The design of the present invention is directed to service 128 duplexed teletype lines having a speed range of 60 to 100 words per minute. This device concentrates the data into 2 word blocks, each word containing 4 characters for transfer into a processor. Other line speeds, including synchronous lines, may be handled and other computer interfaces may be accommodated. It should be noted that the magnetostrictive delay line storage medium is small, inexpensive, rugged and specialized for a given design. The logic is serial-sequential, and the teletype line speed information is "stored" by a mechanical switch position. The line speed switches are interrogated in synchronism with the line data sampling.

Figure 8:
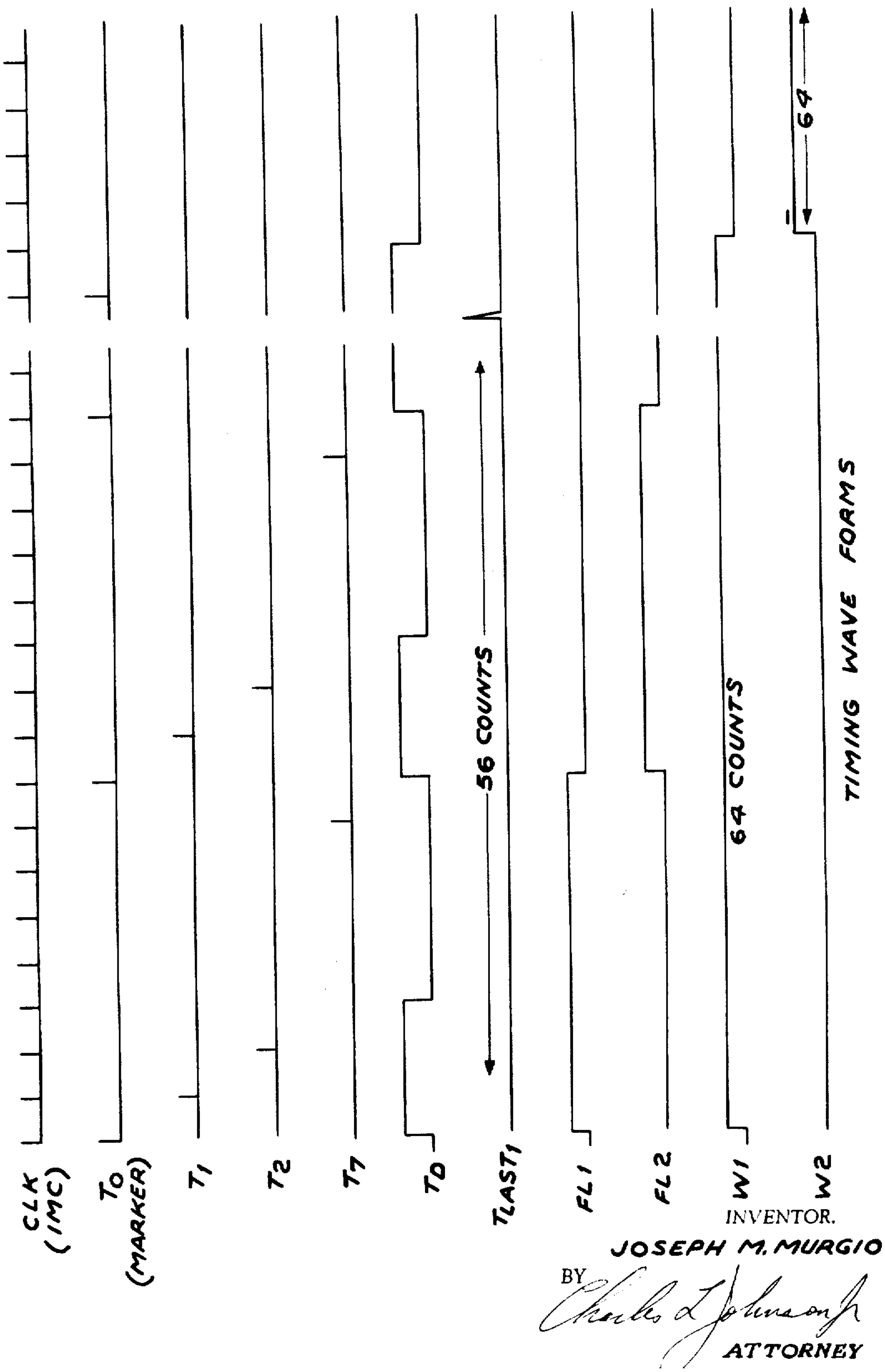
FIG. 8 is a timing diagram showing the waveforms that appear in the invention.

The pulse source 11, of FIG. 1 generates 1 megacycle clock pulses and the timing section 12 counts down the basic 1 megacycle clock into the waveforms shown in FIGURE 8. The basic time period is 8 microseconds long. This is the length of each status word, each character assembly space, and is one quarter of each output word. The basic 8 microsecond time intervals are counted in a 7 stage line counter 14 to define which of the 128 teletype lines is being processed. The decode matrix 16 then selects the proper teletype signal line from the plurality of signal lines and its level appears on the selected line wire 18. This switch setting is then encoded into the proper binary increments for possible insertion into the scanned count of the status word. The timing and decoding means 2 serves both the input and output sections.

Figure 3:
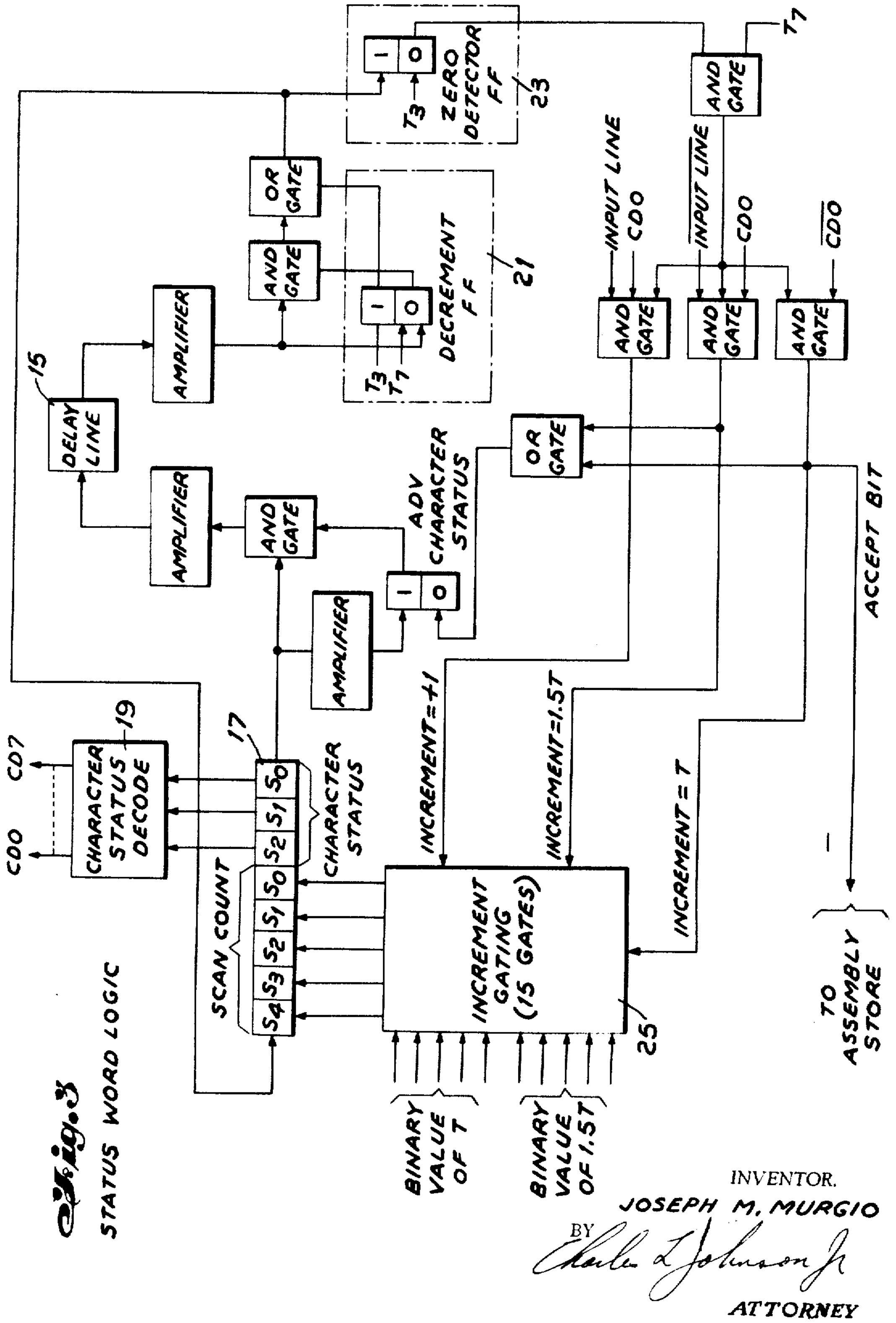
FIG. 3 is a logic diagram of the status storage section of FIG. 1.

The status word means 4 as shown in FIGS. 1 and 3 contains a 1024 bit serial storage loop divided into 128, 8 bit status words. The storage consists of a 1.016 ms., delay line 15 and an 8 bit shift register 17. The status words are all examined sequentially once in 1.024 ms. Each word contains 5 bits of scan count for bit-at-a-time sampling, and 3 bits of character status for controlling the assembly of the bits and the characters. The character status is decoded in the decoder 19. As each word is brought out its scanned count is decremented by one at the decrement circuit 21 and examined for zero at the zero detect circuit 23. Should it not be a zero, it is restored into the delay line 15. If it is a zero and if the character state indicates the character has not started and if the selected teletype signal is a one or mark, the increment of +1 is put into the scan count by the increment gating circuit 25 and the word is restored. If, in the above, the teletype signal were a zero or space, the count value as derived from the speed switches 20 would cause the scan count to go to zero during the center of the next bit time (1.5T, where T is the number of scans per bit) and be inserted into the scan count. The character state is also advanced. Each time the scan count again zeros, the value T is put into the counter to resample the teletype line during the center of the next bit. Also the character state is advanced and a signal is sent to the assembly area 6 to pick up the bit. When the last bit of the character has been assembled, the character state is reset.

Figure 4:
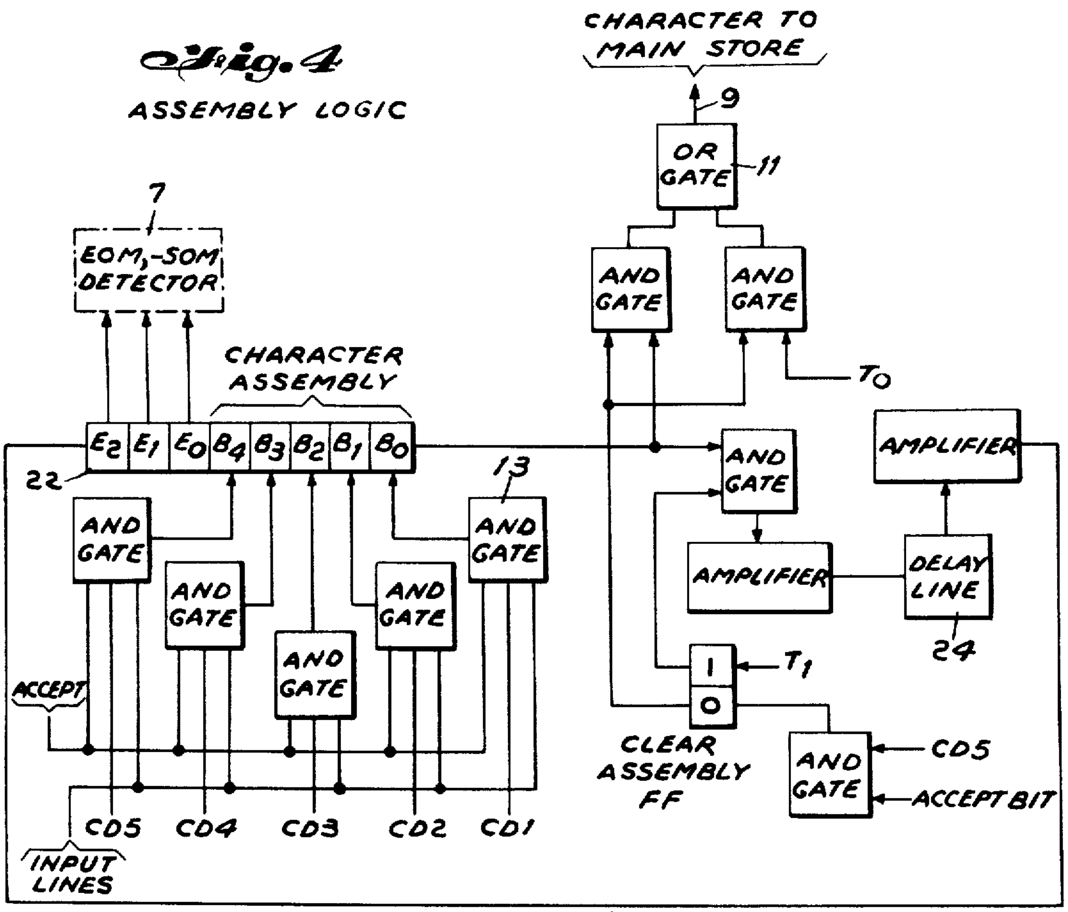
FIG. 4 is a logic diagram of the assembly storage of FIG. 1.

The assembly storage means 6 is illustrated in FIGS. 1 and 4, and also contains 1024 bits of serial storage consisting of an 8 bit shift register 22 and a 1.016 ms., delay line 24. The signals from the status storage means 4 control the assembly of the input bits into the eight bit word which appears in the shift register simultaneously with the appearance of the eight bit status word in the status shift register 17. It may therefore be seen that each teletype line has a one character assembly area available while its status word is reviewed. Gates 13 act to transfer the decoded character state from the status to the assembly storage.

When the last bit of a character is assembled the character is not sent back ino the assembly delay line 24, thereby resetting the character assembly slot, but instead is sent to the main store area 8. In the design of FIG. 4 the smybol detect circuit 7 for detecting the End of Message and Start of Message and case bit implementation has been omitted for simplicity. The character to the main store is gated to conductor 9 from the assembly means 6 by gate 11.

Figure 5:
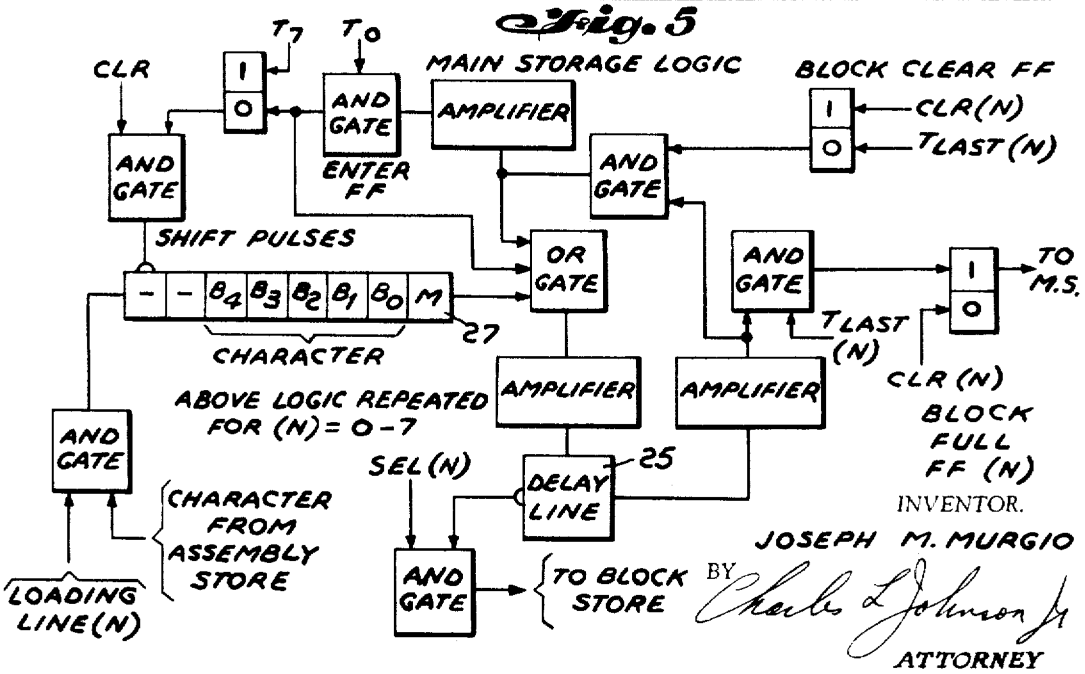
FIG. 5 is a logic diagram of the main storage illustrated in FIG. 1.
Figure 7:
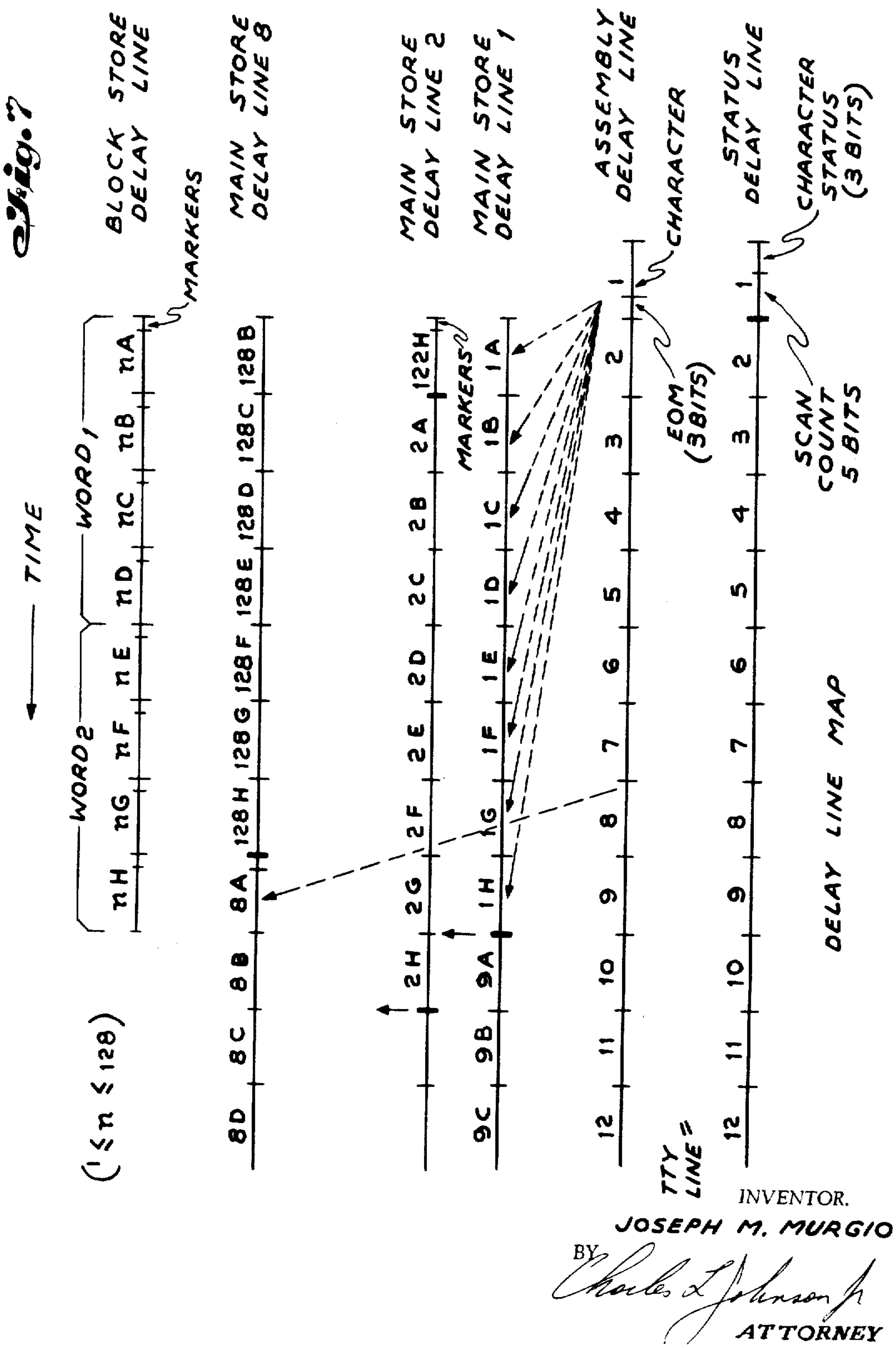
FIG. 7 is a storage map illustrating the use of the magnetostrictive delay lines.

As seen in FIG. 5, the main storage means 8 contains 8 magnetostrictive delay line 25 of 1.024 ms. length. Each delay line 25 has an eight bit register 27, or an eight microsecond lumped constant delay loop which holds a character until the proper insertion time. As a character comes up from the assembly storage means 6, the control logic directs it to the proper holding register. The delay line map of FIG. 7 illustrates the way in which the choice is made. It should be noted that the character labelled 1 (for teletype line 1) and the first slot in the assembly delay line, can be directed into one of eight slots (1A through 1H) of the first main store delay line. Likewise when the character labelled 2 in the assembly line is full it is directed to main store line 2 for placement and to one of the slots 2A through 2H, and so on for all the teletype lines.

The input shift register 27 of the main store delay line, when filled, checks the first bit position (marker position) of each of the eight possible slots as they come out of the delay line. When it detects a slot without a marker, it puts the character into the slot and sets a marker up. In this way the eight slots are filled in sequential order. It should be noted that a marker in the last character then indicates the block is full.

Figure 6:
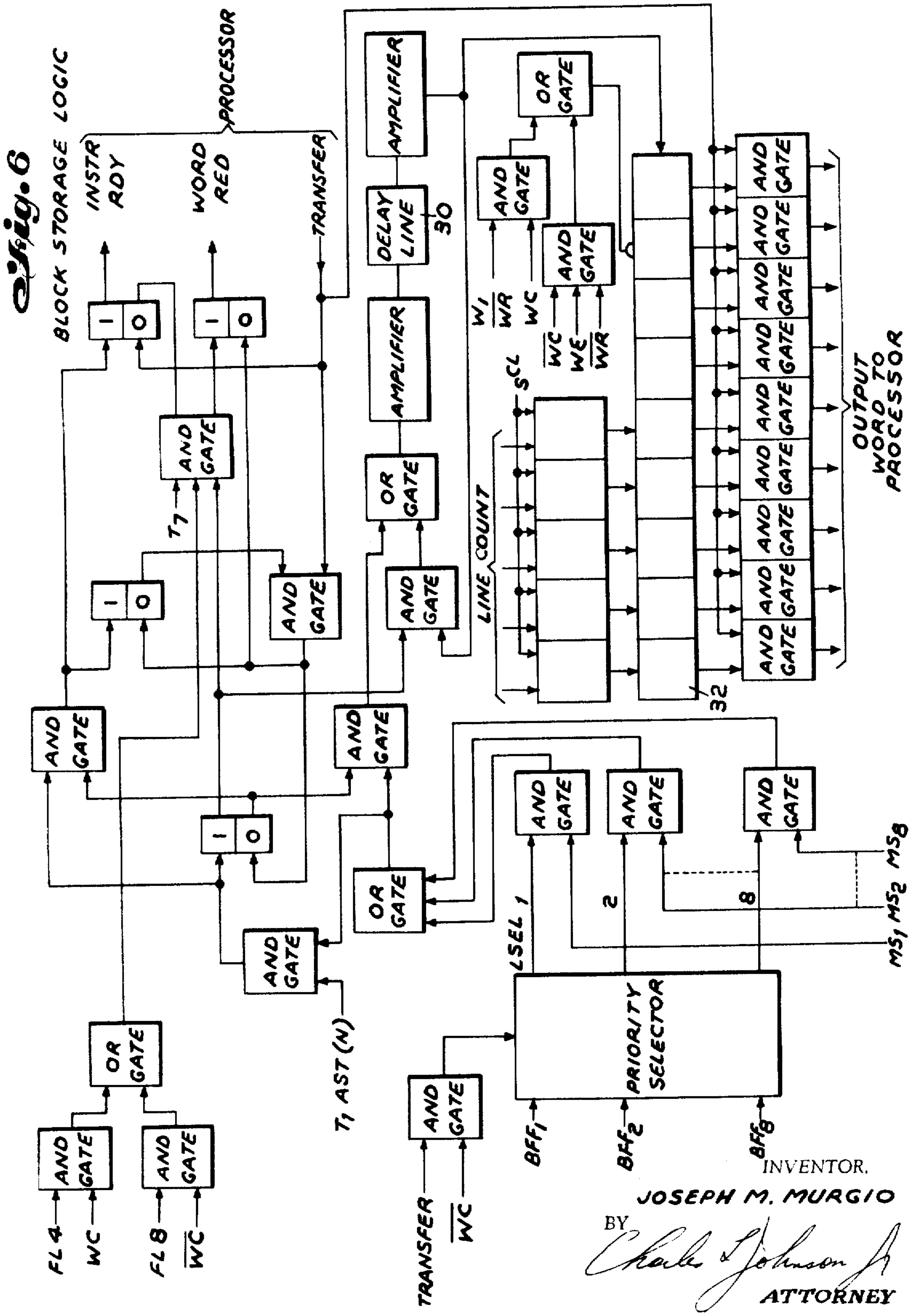
FIG. 6 is a logic diagram of the block storage means of FIG. 1.

Referring now to FIG. 6, the block storage means 10 acts as the interface between the main store means and the processor. The basic function of the block storage means is to monitor the main store lines for full blocks, meaning those having a marker in the last slot. When it detects such a block, it transfers the eight character, 2 words, into its own 64 bit delay line 30, also resetting the main store block space. The control then indicates to the processor that an instruction is ready. A 32 bit shift register 32 is used, as an example, for a parallel bus transfer means. As the block storage fills, the line identity, which is derived from the line count, is set into the transfer register. When the processor requests a transfer, it receives this information as an "instruction." The control then shifts the first word from the delay line 30 into the register 32, signals to the processor and transfers to it on processor request. When both words are transferred, the control resumes its monitor status.

FIG. 2 illustrates the invention in block diagram form as used for output signalling.

From the above it is seen that the objects of the invention have been achieved. It is to be understood that the foregoing represents description of the preferred embodiment of the invention and does not in any way limit the scope of the claims which follow.

What is claimed is:

1. A data system for controlling the receipt and transmission of data between a plurality of information lines and an information processor comprising:

status storage means for identifying serial information from selected information lines;

assembly storage means responsive to the output of the status storage means for accumulating information characters;

timing means interconnecting the information lines, status storage means and assembly storage means so as to selectively monitor the information lines to provide time shared samples of the signals on the information line to the status storage and control the transfer of completed characters to the assembly storage means;

main storage means responsive to the assembly storage means for accumulating a plurality of assembled characters from the assembly storage means; and block storage means interconnecting the main storage means and the processor whereby accumulated blocks of information are transferred from the main storage means to the processor.

2. Apparatus according to claim 1 wherein the status, assembly, main and block storage means include magnetostrictive delay lines for serially circulating the status and information signals.

3. Apparatus according to claim 2 wherein the information lines are teletype lines having a speed range of 60 to 100 words per minute.

4. Apparatus according to claim 3 wherein the said timing means includes a clock pulse generator for generating basic clock pulses, a timing generator for counting down the basic clock pulses to a longer status word period, a line counter operatively responsive to the timing generator for defining which of a plurality of teletype lines is being processed, a decode matrix responsive to the line counter for selecting the proper teletype signal, a selected line wire responsive to the decode matrix for receiving the signal from the selected teletype line, and switch means interconnecting the decode matrix of the timing means and the status storage means so as to selectively transmit signals from the teletype lines to the status storage means at the proper speed as selected by the switch means.

5. Apparatus according to claim 4 wherein the status storage means includes a serial storage loop having a magnetostrictive delay line and a shift register, the said loop including provision for a status word for each of the teletype lines being monitored, and means for sequentially examining the status words, each status word containing a plurality of bits of scan count for bit-at-a-time sampling and a plurality of bits of character status for controlling the assembly of the bits into characters, increment gating means, zero detect means, character status decode means and decrement means interconnected for decrementing the scan count by one and examining for a zero value, whereby, if the scan count is not zero it is reinserted in the delay line while if it is zero and if the character status decode means indicates the character has not started and if the selected teletype signal is a one (mark), the increment of +1 is added to the scan count and the word is restored while if the teletype signal were a zero (space), the count value would cause the scan count to go to zero during the center of the next bit time and is inserted into the scan count, the character state being advanced, each time the scan count goes to zero the number of scans per bit is put into the counter to resample the teletype line during the center of the next bit, the character state being advanced and a signal sent to the assembly storage means, the assembly of the last bit of the character causing the character state to be reset.

6. Apparatus according to claim 5 wherein the assembly storage means includes a magnetostrictive delay line and a plural bit shift register, the signals from the status storage controlling the assembly of the input bits into the plural bit word which appears in the shift register simultaneously with the appearance of the plural bit status word in the status shift register so each teletype line has a one character assembly area available while its status word is reviewed, the assembly of the last bit of a character initiating the transfer of the character to the main storage means.

7. Apparatus according to claim 6 wherein the main storage means includes a plurality of magnetostrictive delay lines, and control logic, each delay line having an eight bit shift register which holds a character until the proper insertion time whereby as a character is transferred from the assembly storage means, the control logic directs it to a holding register in one of the magnetostrictive delay lines, the shift register monitoring the delay line and inserting characters from the assembly storage into the delay line in sequential positions, a marker in the last character indicating the block is full.

8. Apparatus according to claim 7 wherein the said block storage means interconnects the main storage means and the processor and includes a magnetostrictive delay line and logic for monitoring the main storage means lines for full blocks having a marker in the last slot, whereby detection of such a block initiates the transfer of the eight characters into the block storage delay line, resets the main storage block space, indicates to the processor that an instruction is ready so that when the processor signals the block storage means for a transfer the block storage means sends an instruction to the processor followed by the shift of the first word from the block storage delay line into the register for transfer to the processor on request, the transfer of both words to the processor reinstating the monitor status.

References Cited

UNITED STATES PATENTS

| | | | |
|---|---|---|---|
| 3,241,125 | 3/1966 | Tomasulo et al. | 340—172.5 |
| 3,310,780 | 3/1967 | Gilley et al. | 340—172.5 |
| 3,350,697 | 10/1967 | Hirvela | 340—172.5 |
| 3,368,028 | 2/1968 | Windels et al. | 340—172.5 |

PAUL J. HENON, *Primary Examiner.*

J. P. VANDENBURG, *Assistant Examiner.*